United States Patent [19]

Ferguson

[11] Patent Number: 5,283,785
[45] Date of Patent: Feb. 1, 1994

[54] BUS BYPASSING MATRIX SWITCH IN ADD-DROP MULTIPLEXER

[75] Inventor: Stephen P. Ferguson, Coventry, United Kingdom

[73] Assignee: GPT Limited, England

[21] Appl. No.: 777,228

[22] PCT Filed: Mar. 14, 1991

[86] PCT No.: PCT/GB91/00396
§ 371 Date: Nov. 5, 1991
§ 102(e) Date: Nov. 5, 1991

[87] PCT Pub. No.: WO91/14318
PCT Pub. Date: Sep. 19, 1991

[30] Foreign Application Priority Data

Mar. 14, 1990 [GB] United Kingdom ............... 9005723

[51] Int. Cl.$^5$ ........................... H04J 1/10; H04J 3/08
[52] U.S. Cl. ..................... 370/55; 370/85.7; 370/95.1
[58] Field of Search ................ 370/53, 54, 55, 56, 370/112, 84, 85.7, 95.1

[56] References Cited

U.S. PATENT DOCUMENTS

| | | | |
|---|---|---|---|
| 4,434,485 | 2/1984 | Huffman et al. | 370/55 |
| 4,468,767 | 8/1984 | Warren et al. | 370/55 |
| 4,935,920 | 6/1990 | Taniguchi et al. | 370/55 |
| 5,018,135 | 5/1991 | Ashi et al. | 370/55 |

FOREIGN PATENT DOCUMENTS 0674436   5/1988   Switzerland ............... 370/55

OTHER PUBLICATIONS

Proceedings IEEE Global Telecommunications Conference & Exhibition, Nov. 28-Dec. 1, 1988, Hollywood, Fla., N. Fujimoto et al: "Experiment broadband drop/insert/cross-connect system: 1.8 GBIT/S optical shuttle bus", pp. 954-959.
Proceedings of International Symposium on Subscriber Loops and Services, Sep. 29-Oct. 3, 1986, Tokyo, Japan, K. Murano et al: "A Flexible and autonomous network configuration for broadband subscriber loop transmission", pp. 187-192.

*Primary Examiner*—Benedict V. Safourek
*Assistant Examiner*—Ajit Patel
*Attorney, Agent, or Firm*—Kirschstein et al.

[57] ABSTRACT

An add/drop multiplex includes a matrix switch, the drop side of which is connected via buses to respective time slot assignment function circuits which are interconnected by at least one bus capable of transferring traffic between the add and the drop functions of the multiplex.

4 Claims, 3 Drawing Sheets

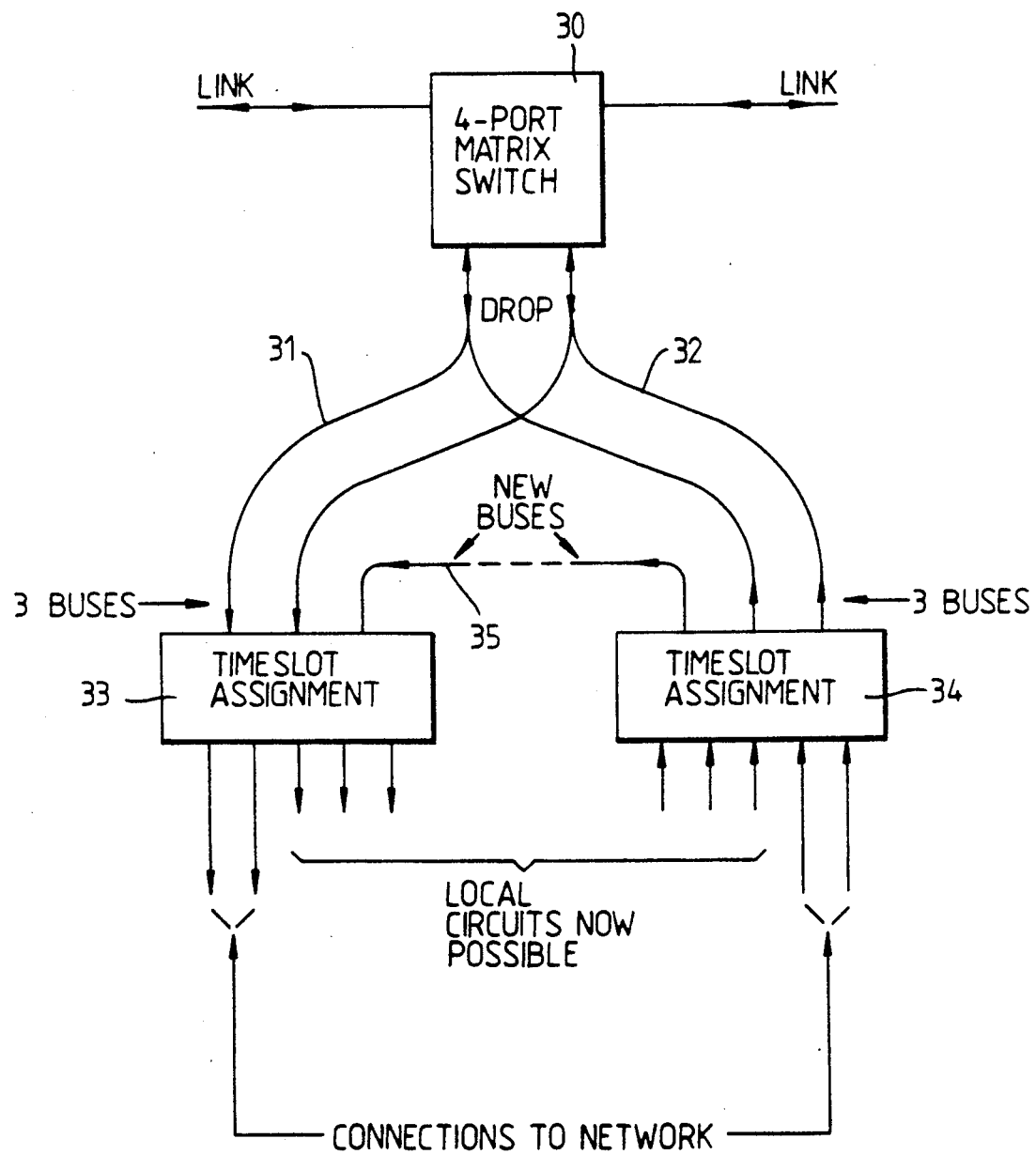

BUS BYPASSING MATRIX SWITCH IN ADD-DROP MULTIPLEXER

BACKGROUND OF THE INVENTION

1. Field of the Invention

This invention relates to an improvement in add-drop multiplexes, known also as add-drop multiplexer, also known in Europe as drop-and-insert multiplexes. Such multiplexes are a particular form of combined multiplexer/demultiplexer for digital signals, optimised for the low cost insertion or extraction of a proportion of the "through" traffic capacity of the multiplex.

2. Description of the Related Art

A digital multiplex combines multiple digital signals streams into a composite stream of digits, each of the digits in the original streams conventionally being allocated to a unique timeslot in the frame structure of the composite stream. Following recognition of the inserted frame start signal at the demultiplexer, the demultiplexer separates the multiple signals so as to restore them to their original form.

In a terminal digital multiplex, all of the capacity of the composite stream is accessible in the form of multiple individual streams; by contrast, in an add-drop multiplex this is commonly not the case, and there are other differences which are outlined below.

It is gradually becoming a common feature of add-drop multiplexes that they incorporate a matrix switch. This switch has the ability to control the routing of traffic in small increments, each of which is a small fraction of the total traffic passing through the multiplex.

Where this fraction is particularly small, the switch has a correspondingly high complexity, because of the large number of such increments to be manipulated, and this invention relates to a proposed simplification of the switch.

SUMMARY OF THE INVENTION

Accordingly the present invention provides an add-drop multiplex comprising a matrix switch, a pair of time slot assignment function circuits connected to the drop-side of the matrix switch, and one or more data buses interconnecting the timeslot assignment function circuits.

BRIEF DESCRIPTION OF THE DRAWINGS

In order that the present invention may be more readily understood an embodiment thereof will now be described by way of example and with reference to the accompanying drawings, in which;

FIG. 4 is a block diagram of an add-drop multiplex according to the present invention.

DETAILED DESCRIPTION OF THE PREFERRED EMBODIMENT

Figure 1:
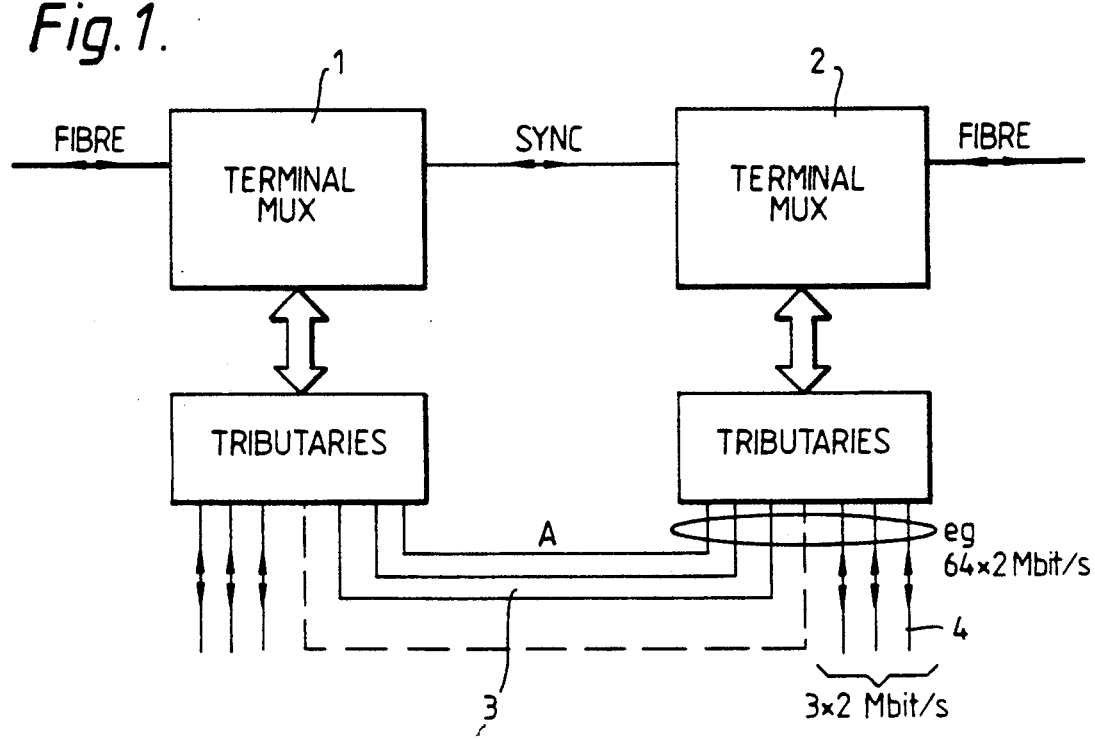
FIG. 1 a block diagram showing the basic functions of an add-drop multiplex.

Referring now to FIG. 1 of the drawings, FIG. 1 shows how an add-drop multiplex is conventionally arranged.

FIG. 1 shows the basic function of an add-drop Multiplex. In the embodiment shown in this figure the traffic is multiplexed demultiplexed at the terminal multiplexes 1 and 2 and sent between the multiplexes via wire links 3. In accordance with requirements the traffic can pass between the multiplexes untouched or can be routed so that it is added to or dropped. Tributaries for adding or dropping traffic are shown at 4. This arrangement has the restriction that it involves the expense of two full terminal multiplexes and requires manual arrangement of the cables each time there is to be a change in routing of any component of the traffic.

Figure 2:
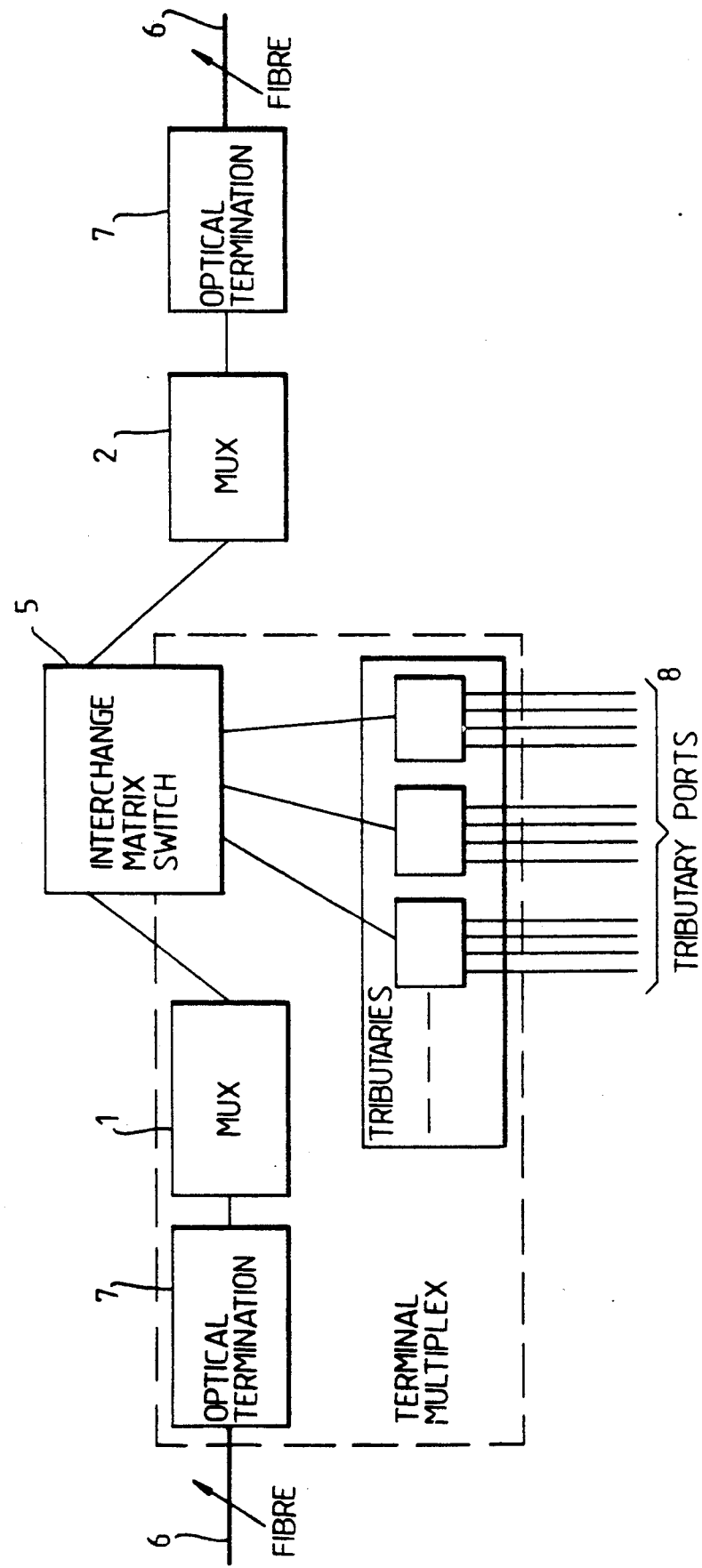
FIG. 2 shows conventional add-drop multiplexes.

Referring now to FIG. 2 of the drawings this shows a conventional add-drop multiplex system where routing flexibility is given by an interchange or matrix switch 5. Optical fibre lines are shown at 6 along with associated optical terminals 7. The output tributaries carrying data to be dropped or added are shown at 8.

The functionality of the interchange or matrix switch varies between designs; in particular it can vary in the following parameters:

a) the size of the smallest increment of traffic which can be routed, and whether such an increment is fixed in size or is variable in the operation of the multiplex.

b) the routing options which are available, e.g. whether the increments can be transferred between timeslots as they pass through the multiplex, or merely be accessed by the add-drop tributary ports (it is not uncommon for selection of the accessible timeslots to be the only degree of routing control which the multiplex offers; where there is no switching function, this control is implemented by physically associating each plug-in card with certain timeslots so that they are accessed automatically if the appropriate card is inserted).

c) whether increments of traffic can be selectively sent back in the direction from which they came, possibly in a different timeslot, in the line with item (b) above.

d) the number of ports on the multiplex which are able to support its full "through" traffic capacity.

Combining the full functions of (a) and (b) allows the management of bandwidth in a chain of add-drop multiplexes. This is intended to be done by opening up a gap in the traffic, freeing an associated group of timeslots by transferring their previous contents to other timeslots, a process referred to as "repacking". As a result, the later insertion of a wideband data channel becomes possible. A wideband channel is conventionally specified so that it must occupy such as associated group of timeslots, rather than being spread piecemeal in a manner similar to that commonly associated with the writing of data to a partially filled computer disc drive.

Item (c) is not normally required of an add-drop multiplex, this aspect of network flexibility being conventionally restricted to cross-connects, which have a much larger traffic capacity than is normal is an add-drop multiplex. This restriction is because at such a facility there is a much smaller probability of the wanted path being unavailable because of being already occupied.

Figure 3:
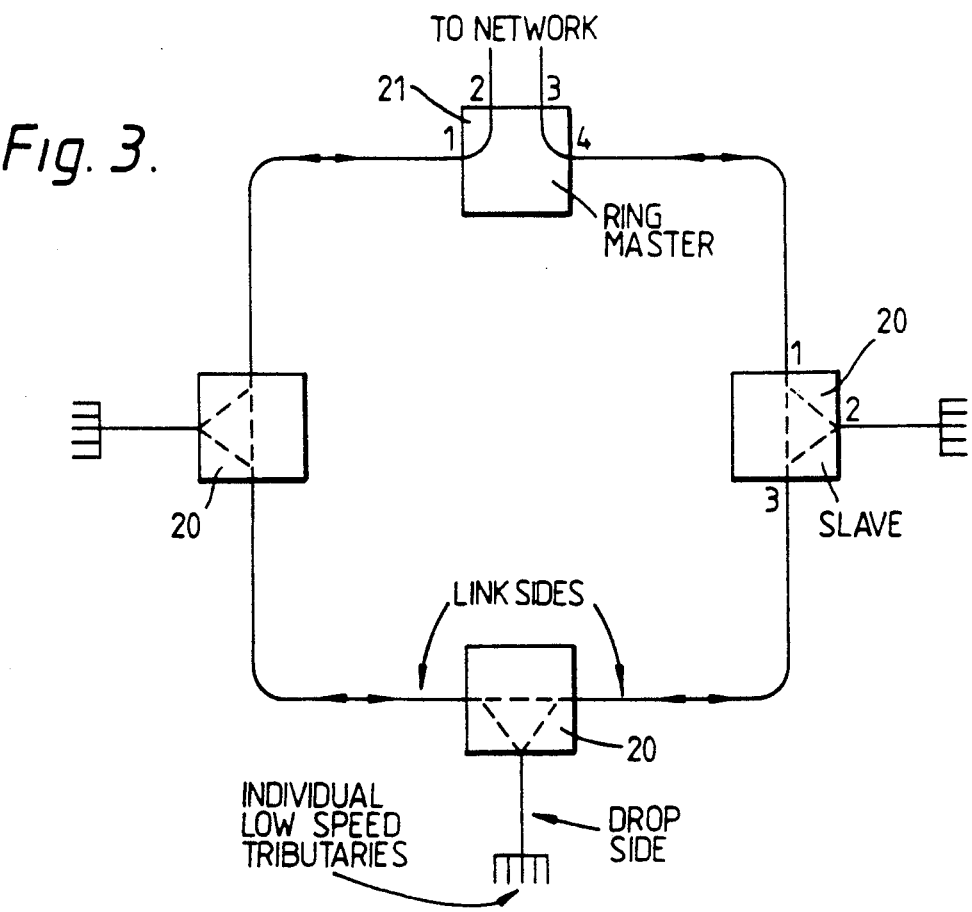
FIG. 3 shows a network incorporating add-drop multiplexes.

Item (d) is illustrated in FIG. 3, which shows two types of add-drop multiplex; these are slave and ring master multiplexes 20, 21. The ring master connects a ring or chain of add-drop multiplexes to the network, and provides the gateway for management control and for network timing to support the operation of the add-drop multiplexes. The remaining multiplexes are slave ones.

In an add-drop multiplex port capacity on the link side is by definition equal to the capacity of the add-drop multiplex. The capacity on the drop side is conventionally asymptotic to the same value, although facilities to access the full capacity are commonly not fitted.

As can be seen in FIG. 3, the ring master 21 has 4 full capacity ports and each slave 20 has 3. This arises because the ring master has two different streams of "through" traffic, one for each side of the ring, while the slave has only one. In practice a proportion of the through traffic of the ring master may be passed along the ring rather than being accessed by the network as shown in FIG. 3.

On a slave multiplex, the drop-side port may take the physical form of a number of relatively low capacity tributaries. On a ring master of the same may be true but these ports may also take the form of a pair of high capacity (i.e. high bit rate) physical ports, as implied in FIG. 3.

In the latter case the ring master has no capacity to spare to support a number of locally arising circuits, i.e. it cannot provide the same function as the slave multiplex, whose entire drop-side capacity is dedicated to just this function.

There are significant commercial situations in which a ring master may be required to provide this kind of drop-side access while still acting as a ring master.

One possible solution to the problem is to provide a fifth port on the ring master, dedicated to the same role as the drop-side port in the slave multiplex. This would result in there being three drop-side ports on the ring master.

Such an arrangement suffers from the disadvantage that switches are commonly constructed from elements with an even number of ports, usually a power of 4, so that large switches can be constructed by a simple interconnection of a number of such elements. For commonality across a range of products, the switching element is an add-drop multiplex should follow this rule also.

An uneconomic alternative to providing a fifth port is to use two add-drop multiplexes at the ring master location, one being the ring master and the other being a slave multiplex. A better scheme is to construct a 6-port switch from a pair of 4-port elements inside the same add-drop multiplex, but this is again unattractive because it involves replicating one of the potentially most expensive elements in the add-drop multiplex in order to gain an increase in port capacity, and this increase is then wastefully large.

A more economic solution can be provided by taking advantage of a further feature which an add-drop multiplex may be required to provide. This feature is consolidation. It arises because traffic streams accessed on the drop-side ports may be only partially filled with traffic. Since the total drop-side capacity of a slave multiplex is commonly equal to the "through" capacity of the multiplex, any partial filling of the tributaries on the drop side represents lost capacity for access.

To overcome this problem, at least one network operator has proposed that add-drop multiplexes be fitted with an excess of tributary port capacity, larger possibly than the "through" capacity. The concept is that some internal concentration will be applied so as to pack the through path more efficiently than the partly loaded tributaries, the multiplex selectively accessing only those time slots which are loaded with traffic.

The invention lies in providing the interchange or matrix switch with an extra pair of interconnected buses. This is shown in FIG. 4. In this figure a 4-port matrix switch 30 occupies the position of the switch 5 in FIG. 2 and also acts as a ring master. The drop side of switch 30 has buses 31, 32 connected to a pair of respective time slot assignment function circuits 33, 34; there being one time slot assignment function circuit for each direction of traffic. The time slot assignment function circuits each have access to all the drop-side capacity of switch 30 and each of the tributary ports can be allocated a share of the total bus capacity.

The each new buses are indicated at 35. Each timeslot assignment function now has the ability to allocate capacity on any bus (three for one direction of traffic, three for the other). The purpose of the new buses 35 is to transfer traffic between the add and drop functions, allowing traffic entering or leaving on one tributary, not only to enter or leave via the link side, but alternatively to do so via another tributary. This is a function normally reserved to a cross-connect and considered inappropriate in an add-drop multiplex, as described in paragraph C earlier in this specification.

In this case however, the extra facility allows possible lower rate tributaries serving local circuits, to be connected either to the "through" path or to the high bit rate tributaries connected to the network, i.e. the facility of a slave multiplex is provided. If not all of the traffic on the link side is to be connected to the network, possibly because it is connected to circulate on the ring, then traffic capacity inherently becomes free on the buses, allowing the local tributaries to access that capacity and connect to the network via the high bit rate tributaries. The described arrangement provides the function of a fifth port, within the inherent capacity limitations of the add-drop multiplex, and with greater economy of circuits and devices than known alternatives.

I claim:

1. An add-drop multiplexer, comprising:
   a matrix switch for routing traffic through the multiplexer, said switch having a drop side;
   input tributaries operatively connected to the switch and having an input tributary ports for adding data to the traffic;
   output tributaries operatively connected to the switch and having output tributary ports for dropping data to the traffic;
   a pair of time slot assignment circuits operatively connected to the drop side of the switch, one of the assignment circuits being operative for assigning time slots for data added via the input tributary ports, and the other of the assignment circuits being operative for assigning time slots for data dropped via the output tributary ports; and
   a bus connected between the assignment circuits and bypassing the switch, said bus being operative for conveying the data between the tributaries without passing through the switch.

2. The multiplexer according to claim 1, wherein the switch is connected in a ring having slave multiplexers, and wherein the switch is a ring master multiplexer.

3. The multiplexer according to claim 1, wherein the switch has a link side and four ports, two of the ports being located on the link side, and the remaining two ports being located on the drop side.

4. The multiplexer according to claim 1, wherein the drop side has two drop ports, and wherein each assignment circuit is connected via a pair of assignment buses to the drop ports.

* * * * *